United States Patent [19]

De Vos et al.

[11] Patent Number: 5,444,101

[45] Date of Patent: Aug. 22, 1995

[54] PROCESS FOR RIGID POLYURETHANE FOAMS

[75] Inventors: Rik De Vos, Rotselaar; Guy Biesmans, Tienen, both of Belgium

[73] Assignee: Imperial Chemical Industries plc, London, England

[21] Appl. No.: 212,634

[22] Filed: Mar. 11, 1994

Related U.S. Application Data

[63] Continuation-in-part of Ser. No. 113,146, Aug. 27, 1993, abandoned.

[30] Foreign Application Priority Data

Apr. 23, 1993 [GB] United Kingdom ............... 9308449
Jul. 20, 1993 [GB] United Kingdom ............... 9315130

[51] Int. Cl.$^6$ ............................................. C08J 9/14
[52] U.S. Cl. ............................. 521/131; 521/155
[58] Field of Search ........................................ 521/131

[56] References Cited

U.S. PATENT DOCUMENTS

| | | | |
|---|---|---|---|
| 3,819,547 | 6/1974 | Pillar et al. | 260/2.5 |
| 4,058,492 | 11/1977 | Von Bonin et al. | 260/2.5 |
| 4,795,763 | 1/1989 | Gluck et al. | 521/99 |
| 4,898,893 | 2/1990 | Ashida | 521/131 |
| 4,972,002 | 11/1990 | Volkert | 521/120 |
| 4,981,879 | 1/1991 | Snider | 521/131 |
| 5,026,502 | 6/1991 | Logsdon et al. | 252/172 |
| 5,034,424 | 7/1991 | Wenning et al. | 521/109.1 |
| 5,096,933 | 3/1992 | Volkert | 521/131 |
| 5,114,986 | 5/1992 | Lin | 521/131 |
| 5,166,182 | 11/1992 | Blanpied | 521/50 |
| 5,290,823 | 3/1994 | Volkert | 521/131 |

FOREIGN PATENT DOCUMENTS

| | | |
|---|---|---|
| 2086997 | 7/1993 | Canada . |
| 0389011 | 9/1990 | European Pat. Off. . |
| 0508649 | 10/1992 | European Pat. Off. . |
| 92/16573 | 10/1992 | WIPO . |

*Primary Examiner*—Morton Foelak

[57] ABSTRACT

Process for the preparation of a rigid polyurethane or urethane-modified polyisocyanurate foam in the presence of a blowing agent mixture comprising cyclopentane and a certain amounts of other organic compounds as co-blowing agenrts, the the saturated vapour pressure of said co-blowing agents in bar at $T_{use}$ (v.p.) complying with the following equation (I)

$$v.p. \geq 0.7 \text{ bar} \times \frac{T_{use}}{298° \text{ K.}} \times \frac{C}{100} \quad (I)$$

wherein C is the mole % of said co-blowing agent in gaseous form on the total blowing agent mixture in the gaseous phase after foaming and $T_{use}$ is the temperature in °K. at which the foam is used.

5 Claims, No Drawings

PROCESS FOR RIGID POLYURETHANE FOAMS

CROSS REFERENCE TO RELATED APPLICATIONS

This application is a continuation-in-part of U.S. patent application Ser. No. 08/113,146, filed Aug. 27, 1993, now abandoned.

DESCRIPTION

This invention relates to processes for the preparation of rigid polyurethane or urethane-modified polyisocyanurate foams, to foams prepared thereby, and to novel compositions useful in the process.

Rigid polyurethane and urethane-modified polyisocyanurate foams are in general prepared by reacting the appropriate polyisocyanate and isocyanate-reactive compound (usually a polyol) in the presence of a blowing agent. One use of such foams is as a thermal insulation medium as for example in the construction of refrigerated storage devices. The thermal insulating properties of rigid foams are dependent upon a number of factors including, for closed cell rigid foams, the cell size and the thermal conductivity of the contents of the cells.

A class of materials which has been widely used as blowing agent in the production of polyurethane and urethane-modified polyisocyanurate foams are the fully halogenated chlorofluorocarbons, and in particular trichlorofluoromethane (CFC-11). The exceptionally low thermal conductivity of these blowing agents, and in particular of CFC-11, has enabled the preparation of rigid foams having very effective insulation properties. Recent concern over the potential of chlorofluorocarbons to cause depletion of ozone in the atmosphere has led to an urgent need to develop reaction systems in which chlorofluorocarbon blowing agents are replaced by alternative materials which are environmentally acceptable and which also produce foams having the necessary properties for the many applications in which they are used.

A class of materials which have been used as alternative blowing agents with zero ozone depletion potential are alkanes and cycloalkanes such as n-pentane, isopentane and cyclopentane. Especially cyclopentane is preferred in view of its lower thermal conductivity. The use of cyclopentane as blowing agent in rigid polyurethane or urethane-modified polyisocyanurate foams is described in U.S. Pat. No. 5,096,933 and further in U.S. Pat. No. 5,114,986, U.S. Pat. No. 5,166,182, U.S. Pat. No. 4,795,763, U.S. Pat. No. 4,898,893, U.S. Pat. No. 5,026,502, European Patent Application No. 389011 and PCT patent application Ser. No. 92/16573.

A disadvantage of rigid polyurethane or urethane-modified polyisocyanurate foams blown with cyclopentane is their poor dimensional stability especially at temperatures below 20° C.: a freshly made foam shows substantial shrinking within the next 24 hours and also within the following weeks. Further the aged thermal insulation properties (this is the thermal insulation loss with time) of such foams is unsatisfactory, particularly at lower temperatures such as 10° C. which is the average temperature of a refrigerator and especially at −10° C. which is the average temperature of a freezer.

It is an object of the present invention to provide cyclopentane blown rigid polyurethane or urethane-modified polyisocyanurate foams having improved dimensional stabilities. It is a further object of the present invention to provide cyclopentane blown rigid polyurethane or urethane-modified polyisocyanurate foams having improved aged thermal insulation properties. Another further object of the present invention is to provide cyclopentane blown rigid polyurethane or urethane-modified polyisocyanurate foams having improved dimensional stabilities and improved aged thermal insulation properties without detrimentally affecting the initial thermal insulation of the foam.

These objects are met by using in the process of making rigid polyurethane or urethane-modified polyisocyanurate foams from polyisocyanates and isocyanate-reactive components besides cyclopentane as blowing agent certain amounts of other organic compounds as co-blowing agents, the saturated vapour pressure of said co-blowing agents in bar at $T_{use}$ (v.p.) complying with the following equation (I)

$$v.p. \geq 0.7 \text{ bar} \times \frac{T_{use}}{298° \text{ K.}} \times \frac{C}{100} \qquad (I)$$

wherein C is the mole % of said compound in gaseous form on the total blowing agent mixture in the gaseous phase after foaming and $T_{use}$ is the temperature in °K. at which the foam is used.

The saturated vapour pressure at $T_{use}$ can be calculated from the boiling point of the co-blowing agent, its molecular heat of evaporation and $T_{use}$ by using the Clausius-Clapeyron equation.

C, the mole % of the co-blowing agent on the total gaseous blowing agent mixture after foaming is determined assuming that no condensation of the blowing agent mixture in the foam cells takes place.

According to the present invention cyclopentane is used in combination with one or more other organic co-blowing agents the saturated vapour pressure of each of said co-blowing agents complying with the above equation (I).

Preferred classes of compounds for use as co-blowing agent according to the present invention are (cyclo)alkanes, hydrofluorocarbons, hydrochlorofluorocarbons, fluorocarbons, fluorinated ethers, alkenes, alkynes and noble gases. Especially preferred classes are alkanes and hydrofluorocarbons.

Examples of suitable (cyclo)alkanes for use according to the present invention include isopentane, n-pentane, neopentane, n-butane, cyclobutane, methylcyclobutane, isobutane, propane, cyclopropane, methylcyclopropane, n-hexane, 3-methylpentane, 2-methylpentane, cyclohexane, methylcyclopentane, n-heptane, 2-methylheptane, 3-ethylpentane, 2,2,3-trimethylbutane, 2,2-dimethylpentane, cycloheptane, methylcyclohexane and 2,3-dimethylbutane.

Examples of suitable hydrofluorocarbons for use according to the present invention include 1,1,1,2-tetrafluoroethane (HFC 134a), 1,1,1,4,4,4hexafluorobutane (HFC 356), pentafluoroethane (HFC 125), 1,1-difluoroethane (HFC 152a), trifluoromethane (HFC 23), difluoromethane (HFC 32), trifluoroethane (HFC 143) and fluoromethane.

Examples of suitable hydrochlorofluorocarbons for use according to the present invention include chlorodifluoromethane (HCFC 22), 1-chloro-1,1-difluoroethane (HCFC 142b), 1,1,1-trifluoro-2,2-dichloroethane (HCFC 123) and dichlorofluoromethane (HCFC 21).

Examples of suitable fluorocarbons for use according to the present invention include perfluoromethane (R 14), perfluorocyclobutane, perfluorobutane, perfluoroethane and perfluoropropane.

Examples of suitable fluorinated ethers for use according to the present invention include bis-(trifluoromethyl) ether, trifluoromethyl difluoromethyl ether, methyl fluoromethyl ether, methyl trifluoromethyl ether, bis(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether and 1,1,1,3,3,3-hexafluoroprop-2-yl fluoromethyl ether.

Examples of suitable alkenes for use according to the present invention include ethylene, propylene, 1-butene, 2-butene, propadiene, butadiene and methylbutene.

Examples of suitable alkynes for use according to the present invention include acetylene and methylacetylene.

Examples of suitable noble gases for use according to the present invention include krypton, argon and xenon.

Preferred compounds for use as co-blowing agents according to the present invention are isopentane, n-pentane and HFC 134a and a particularly preferred compound is isopentane.

By using compounds of which the saturated vapour pressure complies with the above equation (I) as blowing agents in addition to cyclopentane, rigid polyurethane foams are obtained that show improved dimensional stability at $T_{use}$ compared to foams blown with cyclopentane alone.

Thus for example by using isopentane in an amount up to 75 mole % of the gaseous blowing agent mixture in addition to cyclopentane, foams with improved dimensional stability at 10° C. (average temperature at which a rigid polyurethane foam is used in refrigeration) are obtained. Similarly by using n-pentane in an amount up to 55 mole % of the gaseous blowing agent mixture in addition to cyclopentane, foams with improved dimensional stability at 10° C. are obtained.

According to a preferred embodiment of the present invention water or other carbon dioxide-evolving compounds are used together with the blowing agent mixture according to the present invention. Water is usually added to improve the flow of the reaction mixture. Where water is used as chemical co-blowing agent typical amounts are in the range from 0.5 to 3% by weight based on the isocyanate-reactive compound.

The optimum molar ratio cyclopentane/co-blowing agent according to the present invention will therefore depend not only on $T_{use}$ and the vapour pressure of the co-blowing agent but also on the free rise density and on the amount of water that is used.

The optimum molar ratio cyclopentane/isopentane for a polyurethane foam with a free rise density of 22 kg/m$^3$ and a water amount of 0.5 pbw on the isocyanate-reactive component is between 15/85 and 40/60 for $T_{use}$ being 10° C. and between 15/85 and 65/35 for $T_{use}$ being −10° C. The optimum molar ratio cyclopentane/isopentane for a polyurethane foam with a free rise density of 22 kg/m$^3$ and a water amount of 2 pbw on the isocyanate-reactive component is between 5/95 and 45/55 for $T_{use}$ being 10° C. and between 20/80 and 50/50 for $T_{use}$ being −10° C. The optimum molar ratio cyclopentane/isopentane for a polyurethane foam with a free rise density of 22 kg/m$^3$ and a water amount of 3 pbw on the isocyanate-reactive component is between 5/95 and 75/25 for $T_{use}$ being 10° C. and between 25/75 and 35/65 for $T_{use}$ being −10° C.

In addition to the dimensional stability of the foams obtained by using the blowing agent mixture according to the present invention the aged thermal insulation properties of such foams can be improved. This will depend on the diffusion characteristics and thermal insulation properties of the co-blowing agent. The optimal amount of the co-blowing agent will therefore also depend on these characteristics of the co-blowing agent.

In particular when certain amounts of isopentane or n-pentane are used in combination with cyclopentane as blowing agent, rigid polyurethane or urethane-modified polyisocyanurate foams are obtained with improved dimensional stability and improved aged thermal insulation properties compared to foams blown with cyclopentane alone. And surprisingly the initial thermal conductivity of said cyclopentane/isopentane or n-pentane blown foams is not significantly higher than the initial thermal conductivity of cyclopentane blown foams although the thermal insulation properties of isopentane and n-pentane are worse than the thermal insulation properties of cyclopentane. Further isopentane and n-pentane are considerably cheaper than cyclopentane. Thus by substituting part of the cyclopentane by the worse insulating materials isopentane or n-pentane foams are obtained with comparable initial thermal conductivity at lower cost and moreover the dimensional stability and the aged thermal insulation properties of such foams are improved compared to cyclopentane blown foams.

When isopentane or n-pentane is used in combination with cyclopentane the preferred molar ratio cyclopentane/iso- or n-pentane for $T_{use}$ being 10° C. is between 90/10 and 30/70, preferably between 80/20 and 30/70 and more preferably between 70/30 and 40/60 and most preferably between 65/35 and 45/55 in order to obtain rigid polyurethane foams with improved dimensional stability and improved aged thermal insulation properties without significantly affecting the initial thermal conductivity.

In addition to the cyclopentane and the co-blowing agent(s) complying with the above equation (I) the blowing agent mixture according to the present invention may also contain up to 20 mole % of the total blowing agent mixture of other physical blowing agents not complying with equation (I). This is especially true since the commercially available cyclopentane is usually a technical (70 to 80%) grade comprising small amounts of other hydrocarbons rather than a pure grade. Suitable physical blowing agents include those well known and described in the art, for example hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers.

The total quantity of blowing agent to be used in a reaction system for producing cellular polymeric materials will be readily determined by those skilled in the art, but will typically be from 2 to 25% by weight based on the total reaction system.

In order to reduce the cell sizes of the foam and accordingly to improve the thermal insulation properties an inert, insoluble fluorinated compound may be used in the foam-forming process according to the present invention. Such inert, insoluble fluorinated compounds include any of those disclosed in U.S. Pat. No. 4,981,879, U.S. Pat. No. 5,034,424, U.S. Pat. No. 4,972,002 and European Patent Application No. 0508649. Certain of said inert, insoluble fluorinated compounds suitable for use in the process of the invention may themselves act as blowing agents under the conditions pertaining to the foam-forming reaction, particularly where their boiling point is lower than the exotherm temperature achieved by the reaction mixture.

Suitable organic polyisocyanates for use in the process of the present invention include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane.

Polyfunctional isocyanate-reactive compositions with which the polyisocyanate composition can be reacted to form rigid polyurethane or urethane-modified polyisocyanurate foams include any of those known in the art for that purpose. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Preferred initiators for use in the present invention are diaminodiphenylmethane and polymethylene polyphenylene polyamines. Foams made from polyols initiated by these compounds show improved dimensional stability compared to foams made from polyols initiated by other conventional compounds such as sucrose. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

In addition to the polyisocyanate and polyfunctional isocyanate-reactive compositions and the blowing agent mixture of the present invention, the foam-forming reaction mixture will commonly contain one or more other auxiliaries or additives conventional to formulations for the production of rigid polyurethane and urethane-modified polyisocyanurate foams. Such optional additives include crosslinking agents, for examples low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, and fire retardants, for example halogenated alkyl phosphates such as tris chloropropyl phosphate.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

It is convenient in many applications to provide the components for polyurethane production in preblended formulations based on each of the primary polyisocyanate and isocyanate-reactive components. In particular, many reaction systems employ a polyisocyanate-reactive composition which contains the major additives such as the blowing agent and the catalyst in addition to the polyisocyanate-reactive component or components.

Therefore the present invention also provides a polyisocyanate composition or a polyisocyanate-reactive composition comprising as blowing agents cyclopentane and certain amounts of other organic compounds of which the saturated vapour pressure at $T_{use}$ complies with the following equation (I)

$$v.p. \geq 0.7 \text{ bar} \times \frac{T_{use}}{298° \text{ K.}} \times \frac{C}{100} \quad \text{(I)}$$

wherein v.p. is the saturated vapour pressure of said compound in bar at $T_{use}$, C is the mole % of said compound in gaseous form on the total blowing agent mixture in the gaseous phase after foaming and $T_{use}$ is the temperature in °K. at which the foam is used.

The various aspects of this invention are illustrated, but not limited by the following examples.

The following formulation and reaction components are referred to in the examples:

Daltolac XR159: A polyether polyol from Imperial Chemical Industries
Daltolac XR144: A polyether polyol from Imperial Chemical Industries
Daltolac R 180: A polyether polyol from Imperial Chemical Industries
Daltolac R 260: A polyether polyol from Imperial Chemical Industries
Catalyst SFC: A tertiary amine catalyst from Imperial Chemical Industries
Niax A1: A tertiary amine catalyst from Union Carbide
DC 193: A silicone surfactant from Air Products
RS 201: A surfactant from Union Carbide
Cyclopentane A: A 78% grade cyclopentane from Exxon Cyclopentane B: A 98% grade cyclopentane from Shell
Isopentane: A 98% grade isopentane from Janssen
Suprasec DNR: A polymeric MDI from imperial Chemical Industries
Daitolac and Suprasec are trademarks from Imperial Chemical Industries PLC.

EXAMPLE 1

Rigid polyurethane foams were prepared from the starting components given in table 1 (amounts in pbw). Characteristics of the foam-forming reaction profiles, density and thermal conductivity characteristics were determined. Table 1 records the cream time (time taken from the mixing of the two reactive compositions till the onset of the blowing reaction), the string time (time taken for the reaction mixture to reach the transition point from fluid to cross-linked mass) and the end of rise time, all assessed visually. Further the free rise density (density of the foam after free expansion) and the core density (measured according to DIN 53420 standard) of the foam is recorded. Thermal conductivity properties (lambda values) at a mean temperature of 10° C. were determined initially, after 6 days at 70° C., after 3 weeks at 70° C. and after 5 weeks at 70° C.

ing the variation in length, in width and in thickness (according to ISO 2796 standard). The results are presented in table 2.

TABLE 2

| FOAM | | Comp 7 | 8 | 9 |
|---|---|---|---|---|
| R 180 | pbw | 85 | 85 | 85 |
| R 260 | pbw | 15 | 15 | 15 |
| SFC | pbw | 3.5 | 3.5 | 3.5 |
| Niax A1 | pbw | 0.2 | 0.2 | 0.2 |
| Water | pbw | 2.0 | 2.0 | 2.0 |
| RS 201 | pbw | 3.0 | 3.0 | 3.0 |
| Cyclopentane A | pbw | 15.0 | 10.5 | 7.5 |
| Isopentane | pbw | — | 4.5 | 7.5 |
| DNR | pbw | 140 | 140 | 140 |
| Core Density | kg/m$^3$ | 27.5 | 28.1 | 27.4 |
| Dimensional stability after 1 day | | | | |
| length | % | −1.06 | −3.54 | −0.09 |
| width | % | −1.07 | 3.42 | 0.18 |
| thickness | % | 0.76 | 0.53 | 0.63 |
| Dimensional stability after 14 days | | | | |
| length | % | −4.60 | −0.96 | −0.44 |
| width | % | −2.16 | −1.19 | 0.06 |
| thickness | % | 0.43 | 0.62 | −0.18 |

TABLE 1

| FOAM | | Comp 1 | 2 | 3 | 4 | 5 | 6 |
|---|---|---|---|---|---|---|---|
| XR 159 | pbw | 58.0 | 58.0 | 58.0 | 58.0 | 58.0 | 58.0 |
| XR 144 | pbw | 42.0 | 42.0 | 42.0 | 42.0 | 42.0 | 42.0 |
| SFC | pbw | 1.4 | 1.4 | 1.4 | 1.4 | 1.4 | 1.4 |
| Niax A1 | pbw | 0.1 | 0.1 | 0.1 | 0.1 | 0.1 | 0.1 |
| DC 193 | pbw | 3.0 | 3.0 | 3.0 | 3.0 | 3.0 | 3.0 |
| Water | pbw | 2.0 | 2.0 | 2.0 | 2.0 | 2.0 | 2.0 |
| Cyclopentane A | pbw | 15.0 | 13.5 | 12.0 | 10.5 | 9.0 | 7.5 |
| Isopentane | pbw | — | 1.5 | 3.0 | 4.5 | 6.0 | 7.5 |
| DNR | pbw | 140.0 | 140.0 | 140.0 | 140.0 | 140.0 | 140.0 |
| Reaction Profile | | | | | | | |
| Cream time | sec | 10 | 10 | 10 | 10 | 10 | 10 |
| String time | sec | 54 | 54 | 54 | 55 | 56 | 56 |
| End of rise time | sec | 135 | 135 | 135 | 135 | 135 | 135 |
| Free rise density | kg/m$^3$ | 24.1 | 24.4 | 24.9 | 24.5 | 24.4 | 24.0 |
| Thermal Conductivity | | | | | | | |
| Core Density | kg/m$^3$ | 28.25 | 27.75 | 28.45 | 28.75 | 29.0 | 29.3 |
| Initial Lambda | mW/mK | 21.2 | 21.6 | 21.9 | 21.9 | 21.85 | 21.8 |
| Lambda 6d/70° C. | mW/mK | 24.9 | 25.3 | 25.25 | 24.35 | 24.6 | 24.45 |
| Lambda Increase after 6d | mW/mK | +3.7 | +3.7 | +3.35 | +2.45 | +2.75 | +2.65 |
| Lambda 3w/70° C. | mW/mK | 26.85 | 26.95 | 26.8 | 26.3 | 26.15 | 25.85 |
| Lambda Increase after 3w | mW/mK | +5.65 | +5.35 | +4.9 | +4.4 | +4.3 | +4.05 |
| Lambda 5w/70° C. | mW/mK | 27.45 | 27.25 | 27.25 | 26.6 | 26.6 | 26.45 |
| Lambda Increase after 5w | mW/mK | +6.25 | +5.65 | +5.35 | +4.7 | +4.75 | +4.65 |

These results show that by using mixtures of cyclopentane and isopentane in molar ratios of cyclopentane/isopentane ranging from about 90/10 to 40/60 (foams 2 to 6) foams are obtained with improved aged thermal insulation properties without substantially affecting the initial thermal insulation compared to foams blown with cyclopentane alone (comparative foam 1).

EXAMPLE 2

Rigid polyurethane foams were prepared from the starting components given in table 2 (amounts in pbw). The dimensional stability of the resulting foams at −20° C. after 1 day and after 14 days was checked by measur- These results show that by using mixtures of cyclopentane and isopentane foams are obtained with improved dimensional stabilities compared to foams blown with cyclopentane alone (comparative foam 7).

EXAMPLE 3

Rigid polyurethane foams were prepared from the starting components given in table 3 (amounts in pbw). Density and thermal conductivity characteristics were determined. Thermal conductivity properties (lambda values) were determined initially, after 1 week at 70° C., after 3 weeks at 70° C. and after 5 weeks at 70° C.

TABLE 3

| FOAM | | Comp 10 | 11 | Comp 12 | 13 |
|---|---|---|---|---|---|
| XR 144 | pbw | 42.0 | 42.0 | — | — |
| XR 159 | pbw | 58.0 | 58.0 | — | — |
| R 180 | pbw | — | — | 85 | 85 |
| R 260 | pbw | — | — | 15 | 15 |
| SFC | pbw | 1.4 | 1.4 | 3.5 | 3.5 |
| Niax A1 | pbw | 0.1 | 0.1 | 0.2 | 0.2 |

TABLE 3-continued

| FOAM | | Comp 10 | 11 | Comp 12 | 13 |
|---|---|---|---|---|---|
| DC 193 | pbw | 3.0 | 3.0 | — | — |
| RS 201 | pbw | — | — | 3.0 | 3.0 |
| Water | pbw | 2.0 | 2.0 | 2.0 | 2.0 |
| Cyclopentane B | pbw | 15.0 | 7.5 | 15.0 | 7.5 |
| Isopentane | pbw | — | 7.5 | — | 7.5 |
| DNR | pbw | 140.0 | 140.0 | 140.0 | 140.0 |
| Core Density | kg/m$^3$ | 34 | 29 | 35 | 31 |
| Initial Lambda | mW/mK | 21.1 | 21.5 | 21.5 | 22.1 |
| Lambda 1w/70° C. | mW/mK | 23.9 | 24.5 | 25.9 | 26.6 |
| Lambda increase after 1w | mW/mK | 2.8 | 3.0 | 4.4 | 4.5 |
| Lambda 3w/70° C. | mW/mK | 26.0 | 26.1 | 27.4 | 27.4 |
| Lambda increase after 3w | mW/mK | 4.9 | 4.6 | 5.9 | 5.3 |
| Lambda 5w/70° C. | mW/mK | 27.5 | 26.4 | 27.5 | 27.1 |
| Lambda increase after 5w | mW/mK | 6.4 | 4.9 | 6.0 | 5.0 |

I claim:

1. Process for the preparation of a rigid polyurethane or urethane-modified polyisocyanurate foam by reaction of a polyisocyanate composition with a polyfunctional isocyanate-reactive composition under foam-forming conditions in the presence of a blowing agent mixture comprising cyclopentane, characterised in that said blowing agent mixture further comprises certain amounts of other organic compounds as co-blowing agents, wherein said co-blowing agent is selected from the group consisting of an alkane, a cycloalkane and a hydrofluorocarbon, the saturated vapour pressure of said co-blowing agents in bar at $T_{use}$ (v.p.) complying with the following Equation (I):

$$v.p. \geq 0.7 \text{ bar} \times \frac{T_{use}}{298° \text{ K.}} \times \frac{C}{100} \quad \text{(I)}$$

wherein C is the mole % of said co-blowing agent in gaseous form on the total blowing agent mixture in the gaseous phase after foaming and $T_{use}$ is the temperature in °K. at which the foam is used.

2. Process according to claim 1, wherein the co-blowing agent is isopentane or n-pentane or 1,1,1,2-tetrafluoroethane.

3. Process according to claim 1, wherein water is also present in amounts ranging from 0.5 to 3% by weight based on the isocyanate-reactive compound.

4. Process according to claim 2, wherein the molar ratio cyclopentane/isopentane is between 90/10 and 30/70.

5. Process according to claim 4, wherein the molar ratio cyclopentane/isopentane is between 65/35 and 45/55.

* * * * *